US008045202B2

(12) United States Patent
Shirai

(10) Patent No.: US 8,045,202 B2
(45) Date of Patent: Oct. 25, 2011

(54) INFORMATION PROCESSING APPARATUS AND PRINT DEVICE CONTROL METHOD

(75) Inventor: Kenichi Shirai, Kawasaki (JP)

(73) Assignee: Canon Kabushiki Kaisha (JP)

( * ) Notice: Subject to any disclaimer, the term of this patent is extended or adjusted under 35 U.S.C. 154(b) by 919 days.

(21) Appl. No.: 11/782,041

(22) Filed: Jul. 24, 2007

(65) Prior Publication Data

US 2008/0030772 A1  Feb. 7, 2008

(30) Foreign Application Priority Data

Aug. 3, 2006  (JP) .................................. 2006-212239

(51) Int. Cl.
  *G06F 3/12*  (2006.01)
  *G06K 15/00*  (2006.01)
(52) U.S. Cl. ..................... 358/1.15; 358/1.16
(58) Field of Classification Search .................. 358/1.1, 358/1.12, 1.13, 1.14, 1.15, 1.18, 403, 1.16; 400/582
  See application file for complete search history.

(56) References Cited

U.S. PATENT DOCUMENTS

| | | | |
|---|---|---|---|
| 6,616,359 B1 * | 9/2003 | Nakagiri et al. | 400/582 |
| 6,827,514 B1 * | 12/2004 | Shima | 400/582 |
| 7,027,180 B2 * | 4/2006 | Nishikawa et al. | 358/1.18 |
| 7,286,250 B2 * | 10/2007 | Kujirai et al. | 358/1.15 |
| 7,301,665 B2 * | 11/2007 | Barry et al. | 358/1.15 |
| 7,535,591 B2 * | 5/2009 | Kujirai | 358/1.16 |
| 7,612,921 B2 * | 11/2009 | Okabe et al. | 358/403 |
| 2002/0186413 A1 * | 12/2002 | Ito | 358/1.18 |
| 2005/0071495 A1 * | 3/2005 | Kadota | 709/232 |
| 2006/0061793 A1 * | 3/2006 | Nishikawa et al. | 358/1.13 |

FOREIGN PATENT DOCUMENTS

| | | |
|---|---|---|
| JP | 9-134261 A | 5/1997 |
| JP | 11-027492 A | 1/1999 |
| JP | 2003-99221 A | 4/2003 |
| JP | 2005-92413 A | 4/2005 |

OTHER PUBLICATIONS

Office Action, dated Oct. 3, 2008, issued in corresponding JP application No. 2006-212239.
Chinese Office Action dated Apr. 3, 2009, issued in corresponding Chinese Application No. 200710139949.X. English translation provided.

* cited by examiner

Primary Examiner — Gabriel Garcia
(74) Attorney, Agent, or Firm — Rossi, Kimms & McDowell LLP

(57) ABSTRACT

An information processing apparatus, which can be connected to a print device which has a function of saving a print job and combining a plurality of saved print jobs, spools an accepted print job. The apparatus adds first identification information indicating a print job to be combined to the print job to be combined of a plurality of spooled print jobs. The apparatus transmits the print job added with the first identification information to the print device as a save job to be saved on the print device side. The apparatus designates the print device to combine save jobs added with the first identification information. By designating to print the combined save job according to the combining designation, an interrupt of another print job is prevented in print processing of a plurality of print jobs.

14 Claims, 15 Drawing Sheets

JOB INFORMATION FOR EACH JOB

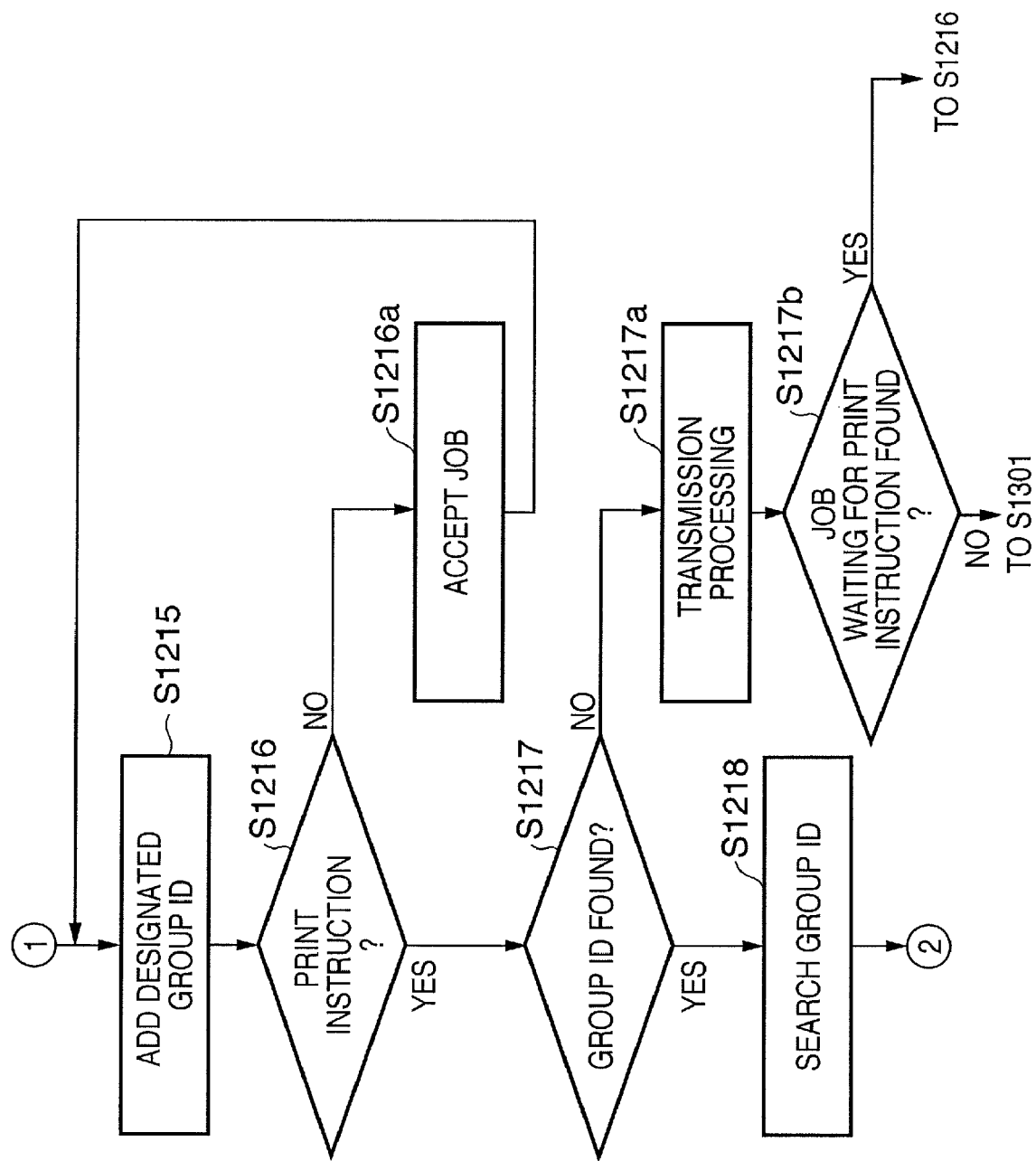
F I G. 10B

INFORMATION PROCESSING APPARATUS AND PRINT DEVICE CONTROL METHOD

BACKGROUND OF THE INVENTION

1. Field of the Invention

The present invention relates to an information processing apparatus and print device control method and, more particularly, to control of a print job.

2. Description of the Related Art

Along with the development of networking in recent years, an environment in which a plurality of information processing apparatuses connected on a network sharing a printer on that network is becoming increasingly popular. In such environment in which a plurality of information processing apparatuses share a printer, these information processing apparatuses issue print requests and the like to one printer. When a single printer accepts print requests from a plurality of information processing apparatuses and executes copy operations, discharged printed materials are mixed with those of other users, and as a result, printed materials may be lost.

Some proposals have been made to solve such problem. As one of such proposals, Japanese Patent Laid-Open No. 09-134261 proposes a method which spools accepted print jobs, combines a plurality of spooled print jobs into one print job, and sends the combined print job to the printer side to form images. Also, Japanese Patent Laid-Open No. 11-027492 proposes a method which allows the user to designate files to be printed and their print order at an operation unit upon printing stored image data, and processes a plurality of files set by the user as a series of image groups which have a sequence in the setting order.

The above two methods handle a plurality of print jobs as one print job, and can prevent the results of these print jobs from getting mixed up upon discharge.

However, since the method of Japanese Patent Laid-Open No. 09-134261 must combine jobs before transmission to the printer and then transmit a combined job to the printer, the load on the information processing apparatus side and that on the network become heavier. Also, the method of Japanese Patent Laid-Open No. 11-027492 requires much labor of the user, since the user must designate files and their print order at the operation unit. Furthermore, when the user forgets to designate a given file, a required file cannot be printed in some cases.

SUMMARY OF THE INVENTION

The present invention has been made in consideration of the aforementioned problems, and provides, according to one exemplary embodiment, an information processing apparatus and print device control method, which can reduce the operation load on an operation unit of the print device side while suppressing an increase in load on the information processing apparatus side, and can implement printing that can prevent an interruption in association with a plurality of print jobs.

According to one aspect of the present invention, there is provided an information processing apparatus, which can be connected to a print device which has a function of saving a print job and combining a plurality of saved print jobs, the apparatus comprising:

a spooling unit adapted to spool an accepted print job;

an addition unit adapted to add first identification information indicating a job to be combined to a print job to be combined of a plurality of print jobs spooled by the spooling unit;

an output unit adapted to transmit the print job added with the first identification information by the addition unit to the print device as a save job to be saved on the print device side;

a combining designation unit adapted to designate the print device to combine save jobs added with the first identification information; and a print designation unit adapted to designate to print the combined save job according to the combining designation by the combining designation unit.

According to another aspect of the present invention, there is provided a method of controlling a print device by an information processing apparatus, which can be connected to the print device which has a function of saving a print job and combining a plurality of saved print jobs, the method comprising:

a spooling step of spooling an accepted print job;

an addition step of adding first identification information indicating a job to be combined to a print job to be combined of a plurality of print jobs spooled in the spooling step;

an output step of transmitting the print job added with the first identification information in the addition step to the print device as a save job to be saved on the print device side;

a combining designation step of designating the print device to combine save jobs added with the first identification information; and a print designation step of designating to print the combined save job according to the combining designation in the combining designation step.

Further features of the present invention will become apparent from the following description of exemplary embodiments with reference to the attached drawings.

BRIEF DESCRIPTION OF THE DRAWINGS

FIGS. 10A and 10B are flowcharts showing processing in this embodiment until setting information of user information is acquired, jobs are specified in correspondence with respective settings, and a group ID is added, so as to specify a plurality of jobs to be combined;

DESCRIPTION OF THE EMBODIMENTS

Preferred embodiments of the present invention will now be described in detail in accordance with the accompanying drawings.

First Embodiment

<System Arrangement>

Figure 1:
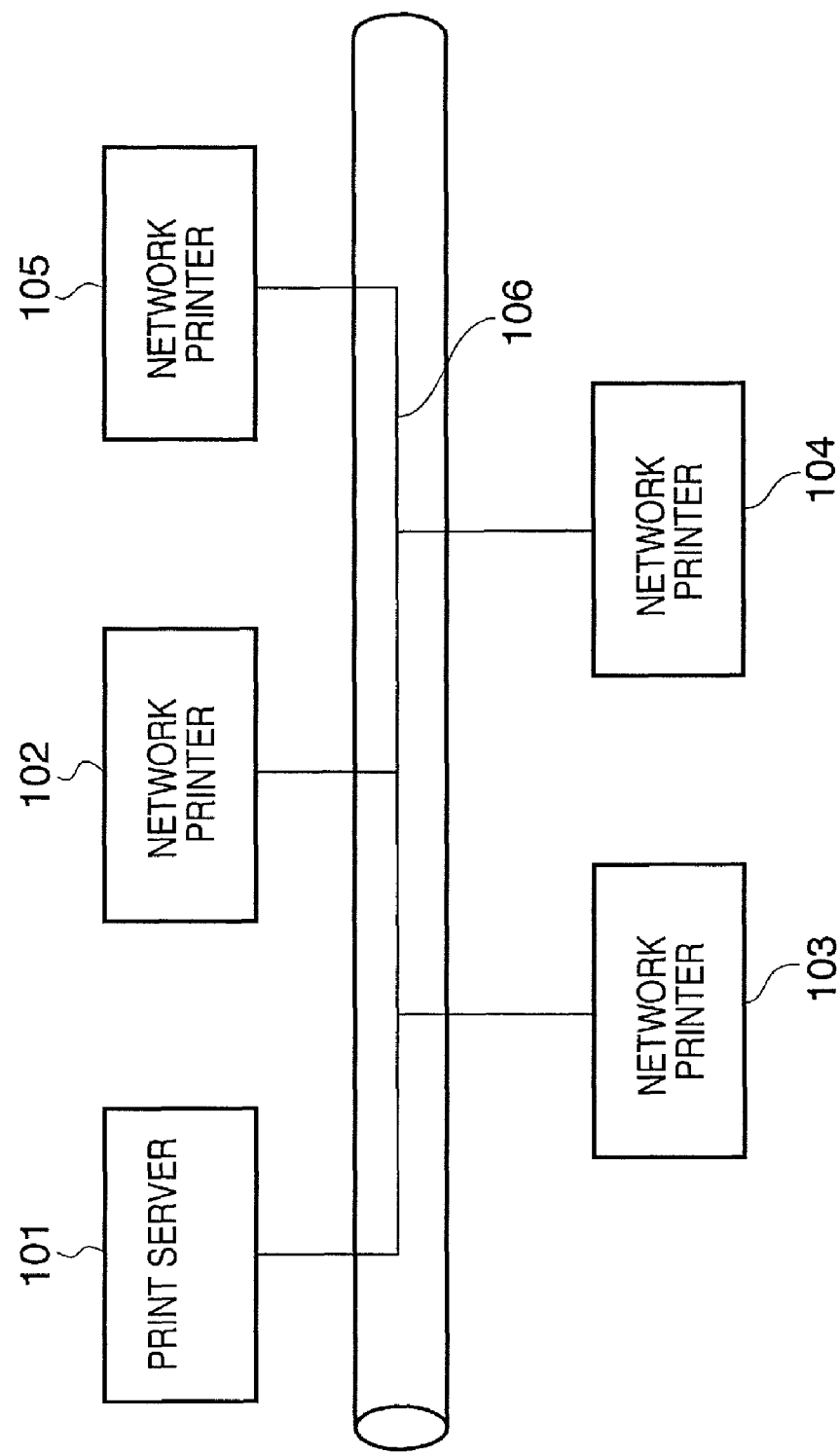
FIG. 1 is a block diagram showing the arrangement of a print system according to one embodiment of the present invention.

FIG. 1 is a block diagram showing the arrangement of a print system according to the first embodiment. Assume that a plurality of network printers are connected in this system, as shown in FIG. 1.

Referring to FIG. 1, reference numerals 102, 103, 104, and 105 denote network printers. The network printers 102 to 105 are respectively connected to a network 106 via network interfaces (not shown). Each of the network printers 102 to 105 analyzes a print job which includes print data and is transmitted from a server computer as a print server 101, converts it into dot image data per page, and prints the dot image data per page. Each of the network printers 102 to 105 comprises a so-called box function which stores the converted dot image data on a memory such as an HDD (not shown) or the like on the network printer, and prints out the data in response to a request issued later. The data saved by the box function can be printed out in response to a designation from the network printer itself or an external computer on the network. Note that the network printers 102 to 105 may adopt printers of various systems such as a laser beam printer that adopts an electrophotography system, an ink-jet printer that adopts an ink-jet system, a printer that adopts a thermal transfer system, and the like.

Reference numeral 101 denotes a server computer which functions as a print server, and will be referred to as a print server hereinafter. The print server 101 is connected to the network via a network cable, stores files used on the network, and monitors the use status of the network 106. The print server 101 manages a plurality of printers connected to the network 106. Note that the print server 101 comprises a general information processing apparatus, which implements functions as the print server by executing stored print control programs.

The network 106 comprises, e.g., Ethernet®, and connects the print server 101, the network printers 102, 103, 104, and 105, and the like.

<Arrangement of Information Processing Apparatus>

Figure 2:
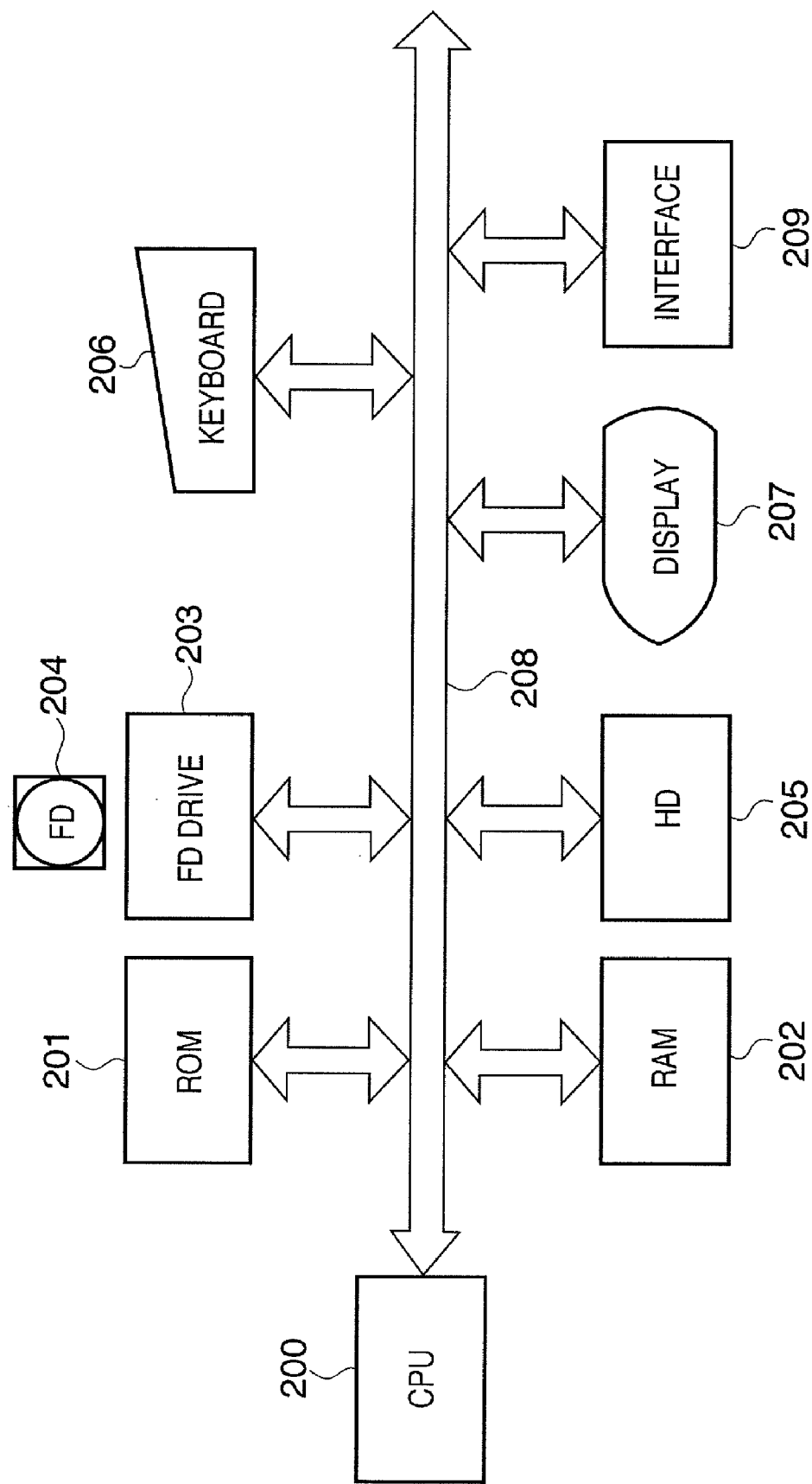
FIG. 2 is a block diagram for explaining the arrangement of an information processing apparatus shown in FIG. 1.

FIG. 2 is a block diagram for explaining the arrangement of the information processing apparatus which functions as the print server 101 shown in FIG. 1.

Referring to FIG. 2, a CPU 200 implements various kinds of control in this information processing apparatus. The CPU 200 executes application programs, a printer driver program, an OS, a network printer control program of this embodiment, and the like, which are stored in a hard disk (HD) 205. A ROM 201 is a read-only memory, and stores programs such as a basic I/O program, and various data such as font data, template data, and the like used in document processing. A RAM 202 is a random access memory which allows read/write accesses, and serves as a main memory, work area, and the like of the CPU 200. When the CPU 200 executes the aforementioned programs, the RAM 202 loads required programs from, e.g., the HD 205, and temporarily stores information, files, and the like required upon execution of the programs.

A floppy® disk (FD) drive 203 is an external storage device used to read out information stored in a floppy® disk (FD) 204. Programs and the like stored in the FD 204 can be loaded onto this computer system via the FD drive 203. Note that the storage medium is not limited to the FD, and may use arbitrary media such as a CD-ROM, CD-R, CD-RW, PC card, DVD, IC memory card, MO, memory stick, and the like. Note that the FD 204 is a storage medium that can store computer-readable programs and/or data.

The HD 205 is one of external storage devices, and comprises a hard disk that serves as a large-capacity memory. The hard disc stores application programs, a printer driver program, an OS, a network printer control program, related programs, and the like. Note that a spooler as a spooling unit is assured on the hard disk. The spooling unit means a server spooler on the print server 101.

A keyboard 206 forms a part of a designation input device. The user can input instructions such as device control commands and the like to the print server 101 using the keyboard 206. A display 207 displays commands input from the keyboard 206, the statuses of the network printers 102 to 105, and the like. A system bus 208 connects the aforementioned units, and controls the data flow in a computer as the print server 101. An interface 209 is used when the information processing apparatus (print server 101) exchanges data with external devices.

<Description of Memory Map, Etc.>

Figure 3:
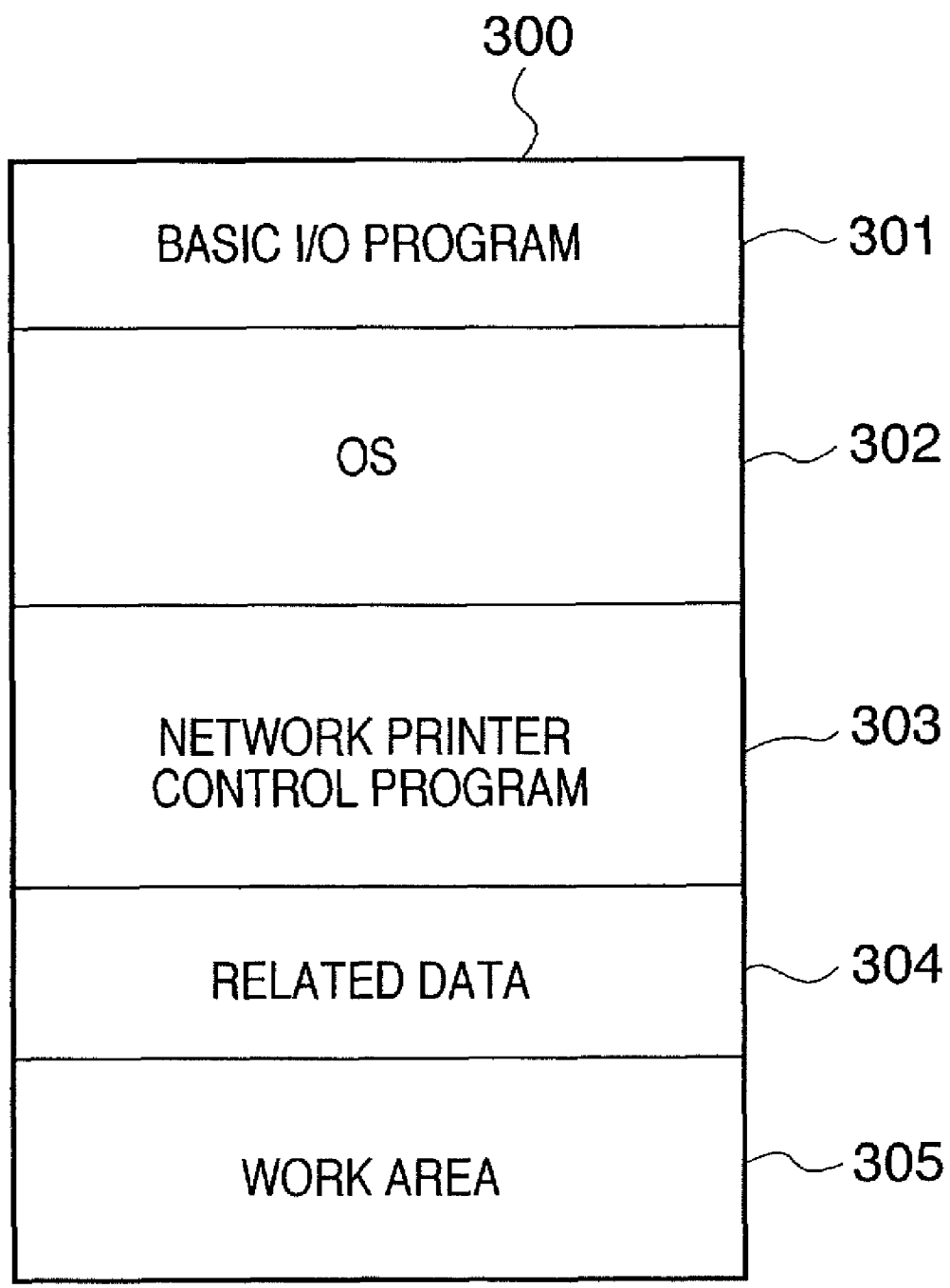
FIG. 3 shows an example of the memory map of a RAM 202 shown in FIG. 2.

FIG. 3 shows an example of the memory map of the RAM 202 shown in FIG. 2. A memory map 300 shown in FIG. 3 shows a state in which a network printer control program loaded from the FD 204 is loaded onto the RAM 202 and is ready to run. The first embodiment will explain an example in which the network printer control program and related data are loaded from the FD 204 onto the RAM 202 and are executed. However, the present invention is not limited to such specific example. For example, every time the network printer control program is launched, it may be loaded from the HD 205 on which the network printer control program has already been installed onto the RAM 202.

A medium that stores the network printer control program is not limited to the FD but may be a CD-ROM, CD-R, PC card, DVD, or IC memory card. Furthermore, the network printer control program may be stored in the ROM 201, and may be directly executed by the CPU 200. Also, software that implements functions equivalent to the aforementioned devices may configure alternatives to hardware devices.

A network printer control program 303 may often be simply called a print control program or scheduler. The print control program includes a program which controls the order of print jobs, and issues a print end notification, print destination change request, and the like of print jobs in the print server 101. In this embodiment, issuing a print request from a client to the print server 101 is called a schedule request, and executing the order control of print jobs and sending a print designation (permission of transmission) to the client is called a schedule up.

A basic I/O program 301 is an area that stores a program having an IPL (initial program loading) function or the like, which loads the OS from the HD 205 onto the RAM 202 and starts the operation of the OS when the power switch of this control apparatus is turned on.

An operating system (OS) 302, the network printer control program 303, and related data 304 are respectively stored in areas assured on the RAM 202. A work area 305 is used when the CPU 200 executes the network printer control program and the like.

Figure 4:
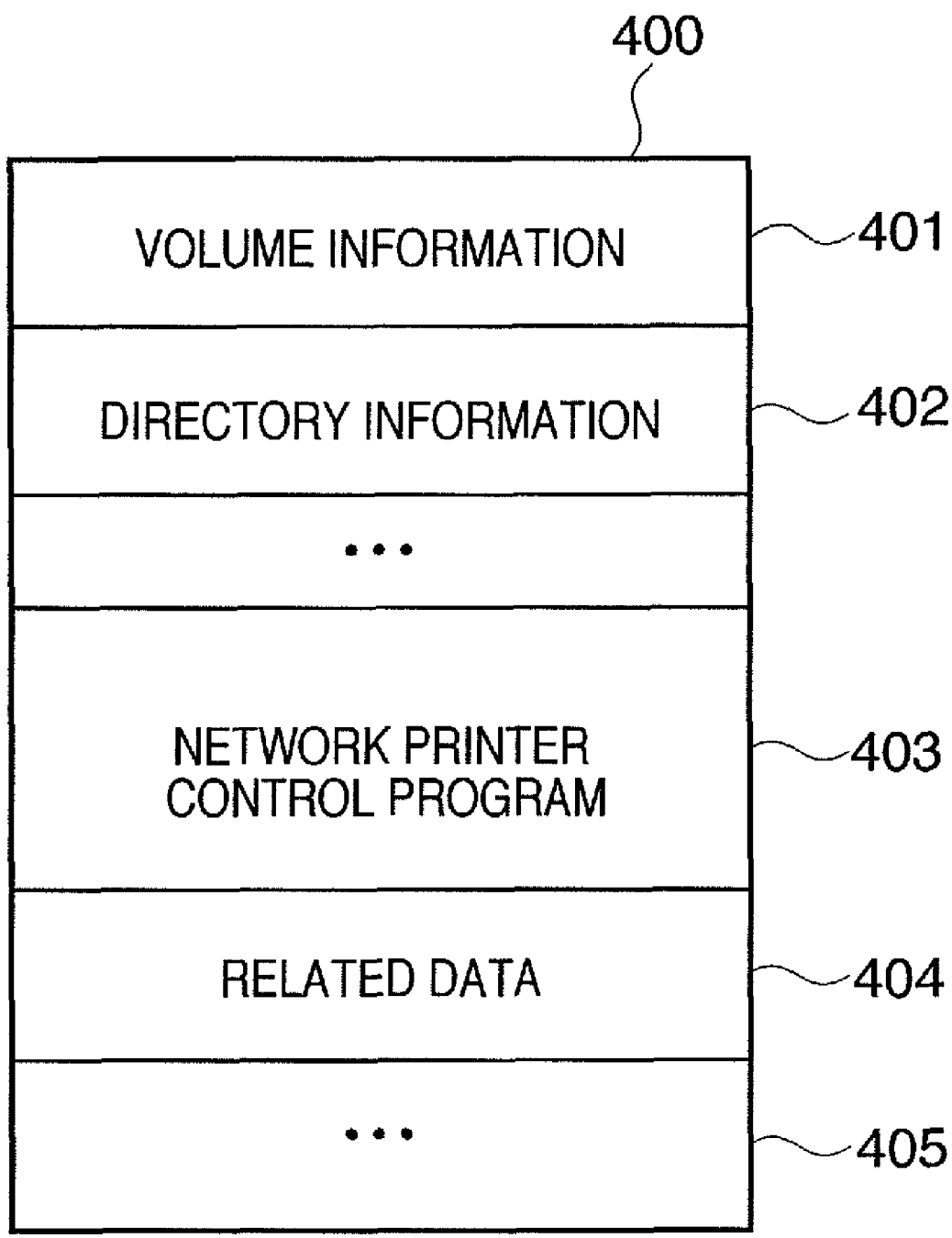
FIG. 4 shows an example of the memory map of an FD 204 shown in FIG. 2.

FIG. 4 shows an example of the memory map in the FD 204 shown in FIG. 2. Referring to FIG. 4, reference numeral 400 denotes data contents of the FD 204. Volume information 401 indicates information of data recorded in the FD 204. The FD 204 records directory information 402, a network printer control program 403 as the print control program described in this embodiment, and its related data 404. Note that the network printer control program 403 is a control program that makes the CPU 200 implement the flowcharts to be described in this embodiment. Upon execution of this program, the network printer control program 403 is loaded onto the RAM 202 as the network printer control program 303, and is executed by the CPU 200.

<Print Job Control System>

A print control system which executes scheduling and print control of print jobs in this embodiment will be described below. Note that print processing of this print control system is implemented when the CPU 200 executes the aforementioned network printer control program 303.

<Processing of Print Job>

Figure 5:
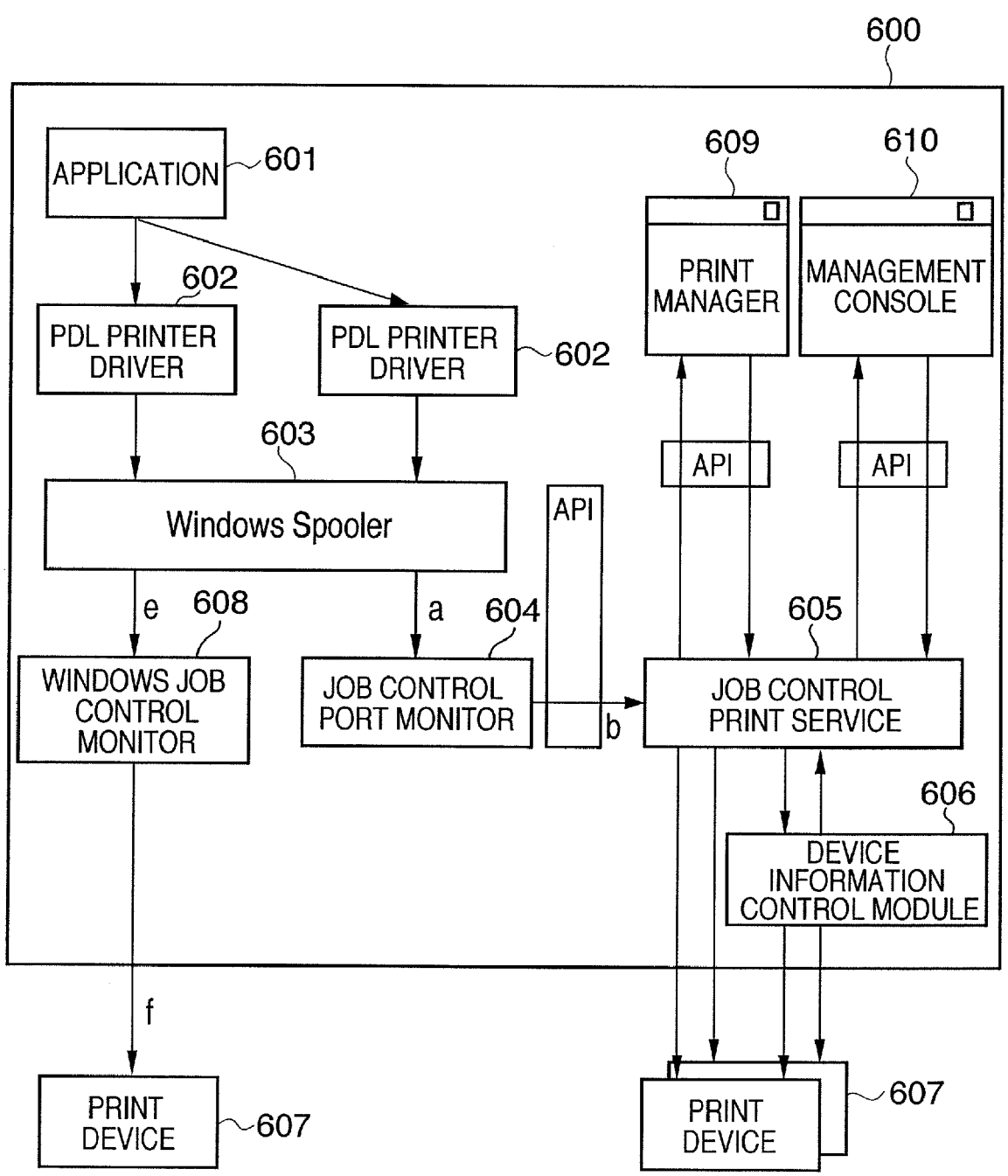
FIG. 5 is a diagram showing the processing of a print job issued by an application.

FIG. 5 is a diagram showing the arrangement for processing a print job issued by an application. FIG. 5 represents how to process a print job, which is issued by a general application such as Microsoft Word® in a client-server model of this system, by the print job control system.

Referring to FIG. 5, a server 600 corresponds to the print server 101, and indicates a machine on which modules of the print job control system run. Normally, when issuing a print designation, the following procedure is carried out. An application program 601 generates a series of rendering commands via a graphic function of the OS. The series of rendering commands are passed to a Windows® spooler 603 as print job data via a PDL printer driver (to be referred to as a printer driver hereinafter) 602. The Windows® spooler 603 passes the print job data to a port monitor (windows job control monitor 608) selected by the user, and controls it to transmit the print job data to a print device 607 (corresponding to the network printers 102 to 105).

By contrast, in this embodiment, the user issues a print designation while designating a port monitor for the print job control system (to be referred to as a job control port monitor 604 hereinafter) in advance. As described above, the application program 601 generates a series of rendering commands via the OS. The printer driver 602 receives the rendering commands, and generates PDL data (print job data). The printer driver 602 transmits the print job data to the job control port monitor 604 in place of a Windows® job control monitor 608 that transmits print job data to the print device 607. The job control port monitor 604 transmits the print job data to a print service for the print job control system (to be referred to as a job control print service hereinafter) 605 in place of the print device 607. The job control print service 605 is software comprising a function of managing the statuses of jobs/devices.

Furthermore, when a device and client PC operate in a peer-to-peer connection environment, the job control print service 605 comprises a function of managing information such as a device status, job status, and the like notified from the device, and issuing a predetermined instruction to the device. This corresponds to a function of managing device information and job information of a plurality of print devices 607.

The job control print service 605 comprises a function of monitoring statuses such as a print in execution status, power control status, failure information (paper jam), and the like of respective devices (print devices) with which the service 605 can communicate via the network. For example, the job control print service 605 communicates with respective print devices 607 using a device information control module 606 and acquires and manipulates information associated with print jobs and operation statuses in the respective print devices.

A print manager for the print job control system (to be referred to as a print manager hereinafter) 609 is a program which allows the user to check the status of a print job inside the job control print service 605. The print manager 609 provides a user interface (UI) used to manipulate a print job.

The print manager 609 executes transmission/reception of information with the job control print service 605 via a software interface (API) of the job control print service 605. With this transmission/reception, the print manager 609 acquires, as an event, status information of each external print device managed by the job control print service 605. As the notification type of the acquired event, notification of error/warning information such as a warning indicating a short toner remaining amount, a communication failure between the client and device, an insufficient memory capacity, full loading on a discharge tray, and the like, notifications of normal information that indicates recovery from an error state to a normal state and the like are assumed.

The job control print service 605 comprises a management console 610. The management console 610 exchanges information and designations with the job control print service 605 via an API of the job control print service 605, thus monitoring the overall print job control system.

<Printing from Print Application>

Printing from the application program 601 will be described below.

The printer driver 602 converts a series of rendering commands generated by the application program 601 into a PDL (page description language) file that can be interpreted by the print device 607. This PDL file is transferred from the Windows® spooler 603 to the job control print service 605 (arrow b in FIG. 5) via the job control port monitor 604 (arrow a in FIG. 5). The job control print service 605 controls the operation of the print job according to the type of job control to be executed for this print job.

As described above, in a general Windows® print system, the printer driver 602 converts a series of rendering commands generated by the application program 601 into a PDL file that can be interpreted by the print device 607 this PDL file is transferred from the Windows® spooler 603 to the print device 607 (arrow f in FIG. 5) via the Windows® job control monitor 608 (arrow e in FIG. 5).

<Relationship between Windows® Print System and Print Job>

Figure 6:
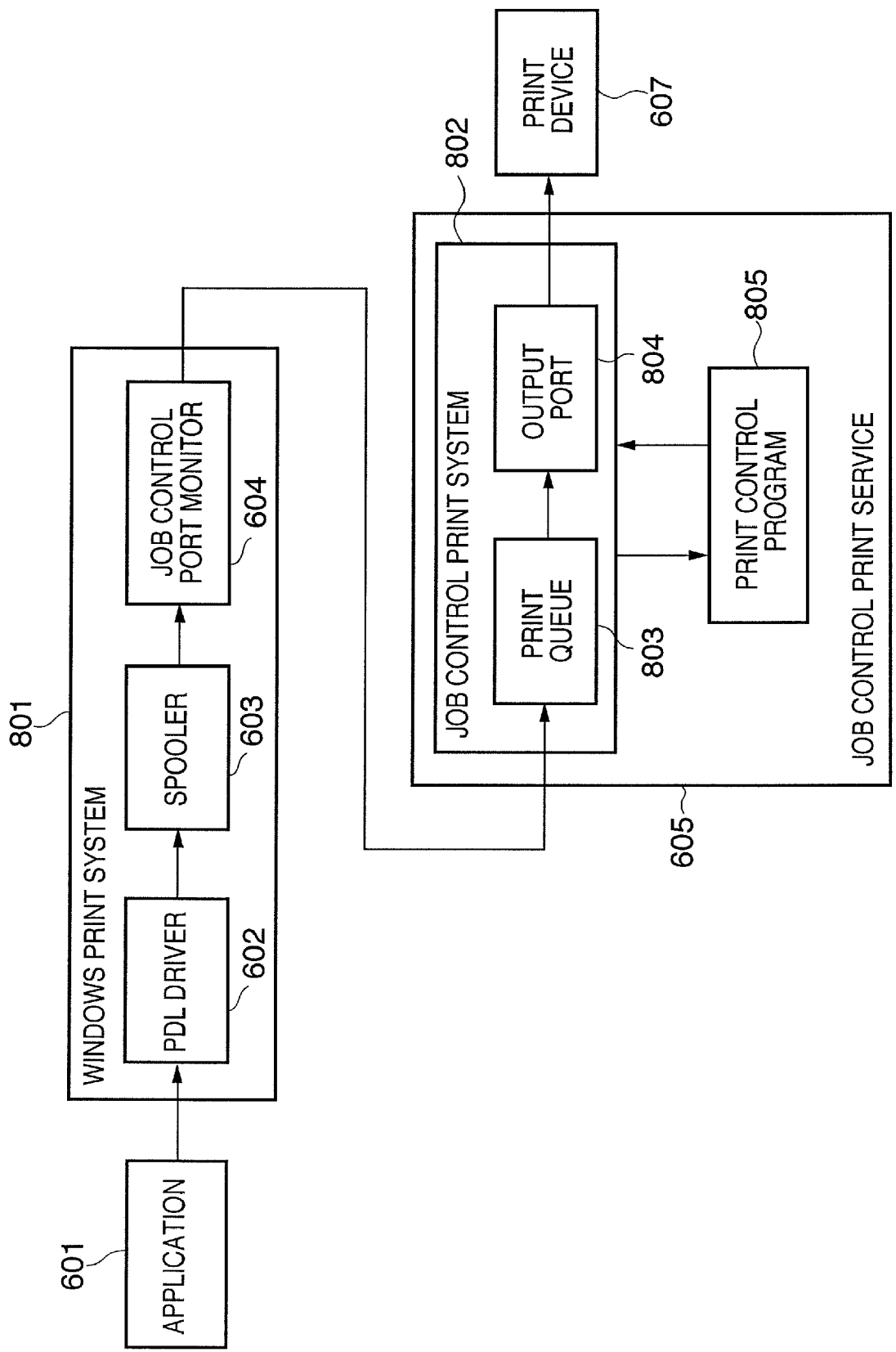
FIG. 6 is a diagram showing the flow and management location of a print job in this embodiment.

The relationship of a print job between a print system provided by Windows® and the print job control system and an overview of processing will be described in more detail below with reference to FIG. 6. FIG. 6 shows the management locations of a print job after the print job is input in this embodiment.

Referring to FIG. 6, the job control print service 605 indicates a print job control system on which the control program of the server 600 runs.

In this embodiment, the job control print service 605 transmits print job data held in the spooler 603 to the print device 607 corresponding to the printer driver 602 selected by the application.

When the print job transits from a Windows® print system 801 to the job control print service 605, a job control print system 802 manages the print job using a print queue 803 and output port 804. The print queue 803 spools and manages print jobs in the order they are received from the Windows® print system 801, and passes a print job whose spooling is completed to the output port 804. The job control print system 802 issues a schedule request of the print job passed to the output port 804 to a print control program 805. The print control program 805 which determines the print order manages print jobs in the generation order of schedule requests from the job control print system 802, and issues a print designation. The output port 804 transmits the print job, whose print designation is received from the print control program 805, to the print device 607. The print device 607 executes print processing of the print jobs in the order they are received from the output port 804. Note that print control program 805 may accept schedule requests from the job control print system 802 of an external device (client device).

As described above, in this embodiment, the print jobs are managed by the print queue 803, output port 804, print control program (scheduler) 805, and print device 607.

Figure 7:
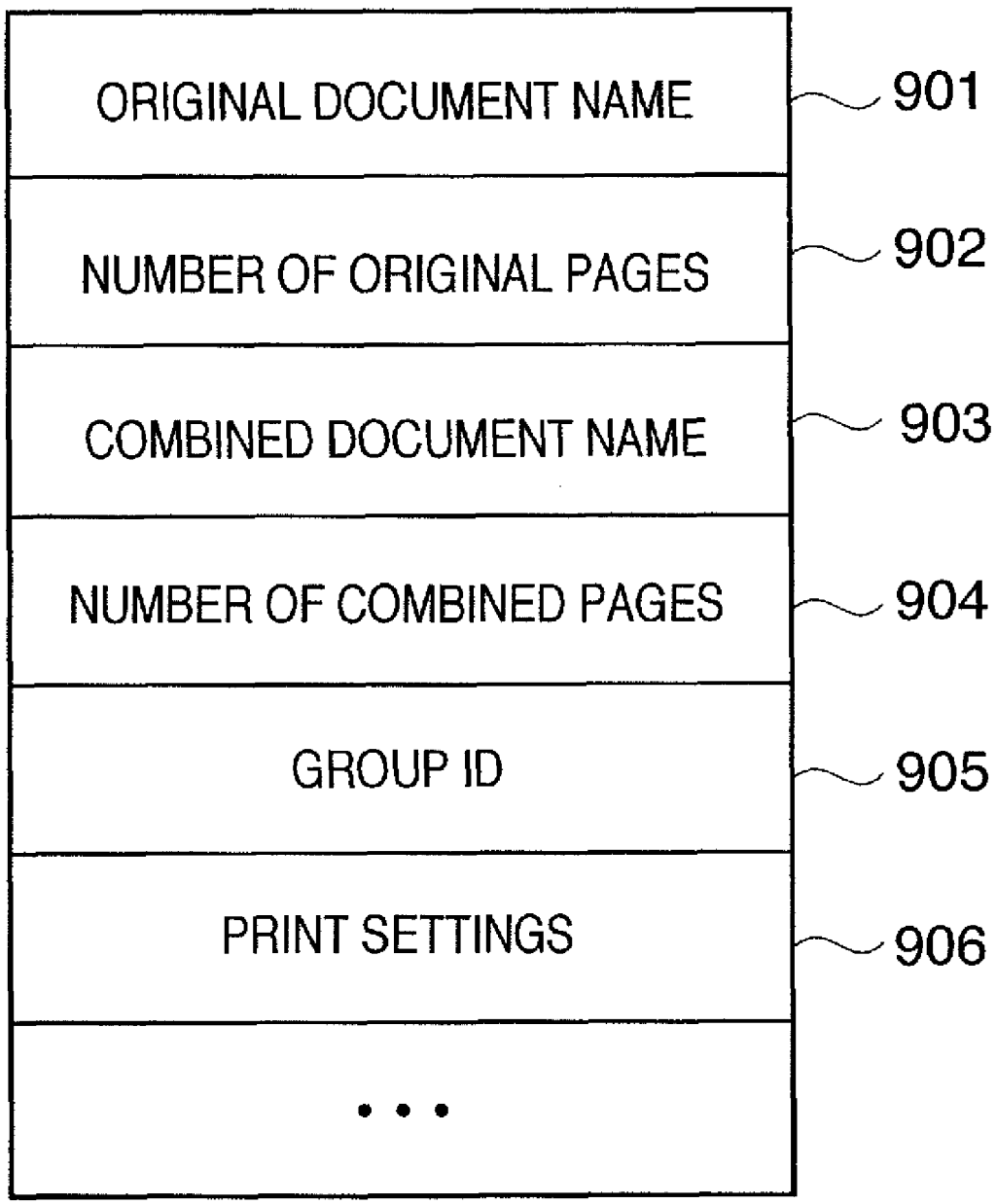
FIG. 7 shows various kinds of information of a print job managed by a job control print service in this embodiment.

FIG. 7 shows an example of the data configuration of a print job managed by the job control print service 605.

An original document name 901 is the name of a print job set by the printer driver 602 or the like. The number of original pages 902 is the number of pages of the print job. A combined document name 903 is a name which is set by the user or print device for a print job obtained by combining a plurality of print jobs on the print device. The number of combined pages 904 is the number of pages of the combined print job. A group ID 905 is an identifier set by the job control print service 605, and the same group ID is set for print jobs to be combined. Print settings 906 indicate a job type, i.e., whether the job of interest is a box save job or print job. Various settings shown in FIG. 7 are generated based on a user's designation via a user interface used to issue a print designation or a notification from the print device.

Note that the box save job is a job which is temporarily stored in a storage unit such as an HDD (hard disk drive) or the like equipped in the print device without immediately printing out print job data. As data formats to be temporarily stored, data of the bitmap format, data of the predetermined compression format such as JPEG or the like, intermediate data which is obtained by rasterizing rendering data such as PDL data or the like and is described in a simple language before final bitmap data, and the like can be applied.

Figure 8:
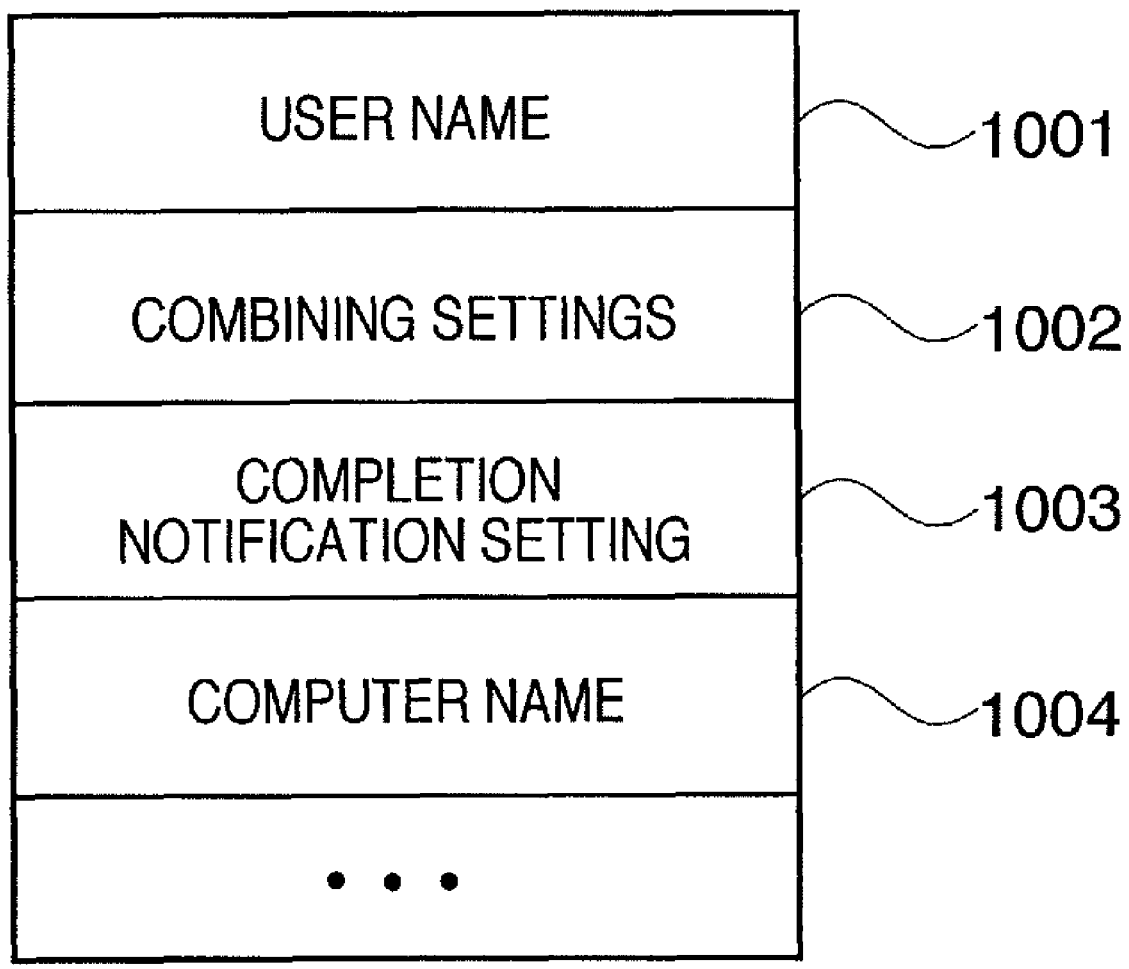
FIG. 8 shows user information held by a job control print service 605.

FIG. 8 shows user information held by the job control print service 605 in this embodiment.

A user name 1001 indicates the name of the user who inputs a print job. Combining settings 1002 are setting information used to determine print jobs to be combined when print jobs are input. The combining settings 1002 record setting information associated with print jobs to be combined, and grouping of print jobs to be described later using the flowcharts of FIGS. 10A and 10B. In this embodiment, as the settings associated with grouping of print jobs, one of three types "combined job number designation", "acceptance period designation", and "group ID designation" can be selected. The combining settings 1002 include setting information of a group ID corresponding to "group ID designation". A completion notification setting 1003 is setting information indicating whether or not a notification is made upon completion of discharging of the combined print job, upon completion of combining of print jobs, and so forth. A computer name 1004 indicates the name of a computer used to input a job. Various settings shown in FIG. 8 are generated based on a user's designation via a user interface used to issue a print designation. Also, each user may set some or all of various settings shown in FIG. 8 in correspondence with each printer device that he or she can designate. In this way, when the user selects printer device A, the combining settings 1002 stored in correspondence with printer device A in advance are selected. This amounts to the setting of printer device A as that used to issue a combined job by that user.

Figure 9:
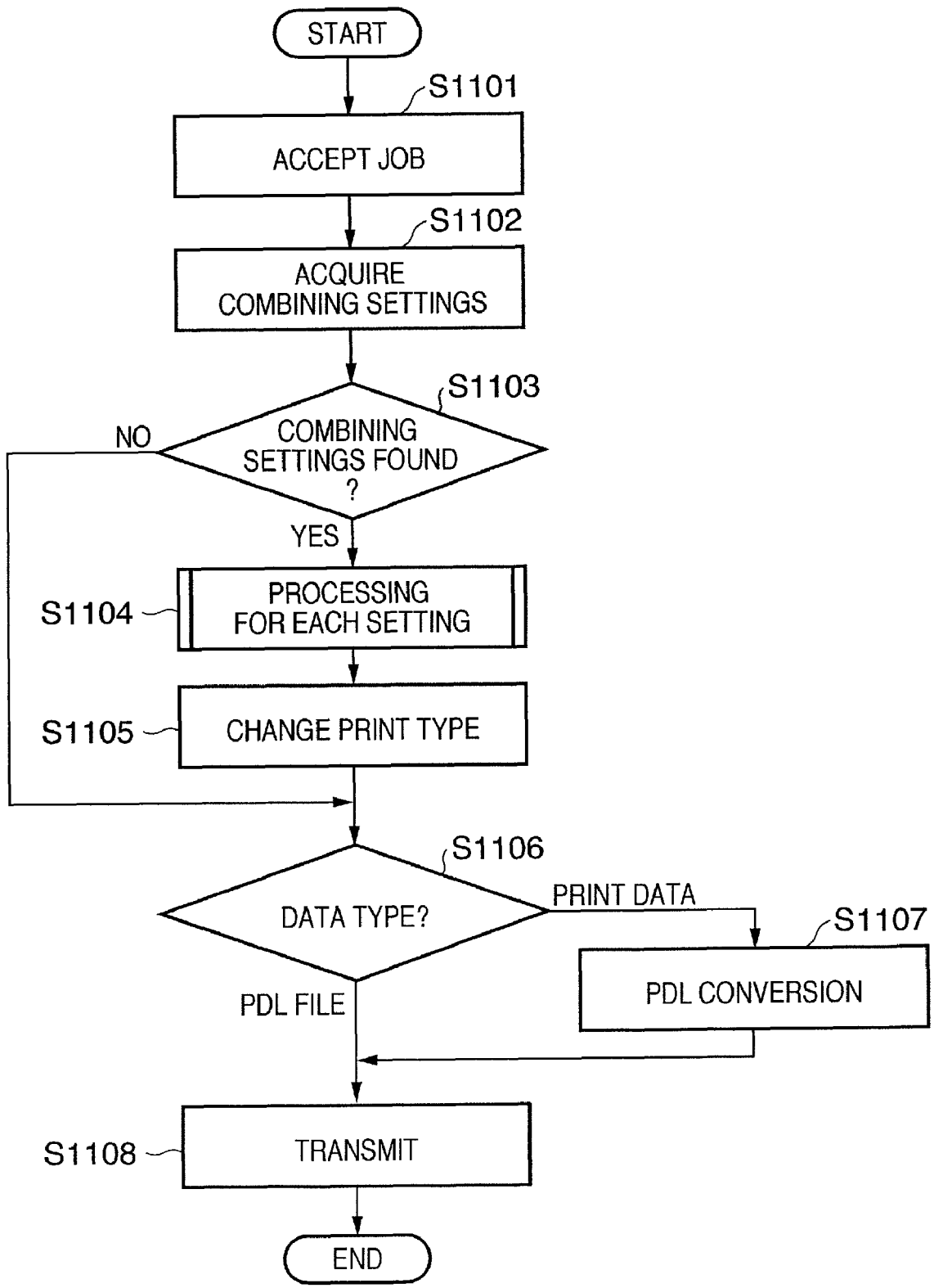
FIG. 9 is a flowchart showing processing in this embodiment from when the job control print service 605 accepts a job until it transmits the job to a print device.

FIG. 9 is a flowchart showing processing from when the job control print service 605 of this embodiment accepts a job from the Windows® print system 801 until it transmits the job to the print device.

In step S1101, the job control print service 605 accepts a print job generated by the application program 601. For example, the job control print service 605 accepts, as a print job, a PDL file that can be interpreted by the print device via the Windows® print system 801. Alternatively, the job control print service 605 may accept, as a print job, source print data of printing (also called intermediate data).

In step S1002, the job control print service 605 acquires the combining settings 1002 from the held user information (FIG. 8). The job control print service 605 checks in step S1103 if the combining settings 1002 acquired in step S1102 include setting information. If the acquired combining settings 1002 include setting information, the process advances to step S1104; otherwise, the process jumps to step S1106.

In step S1104, the job control print service 605 executes processing according to the settings of the combining setting information to specify a plurality of print jobs to be group jobs, and to add a group ID to these jobs. Details of this step will be described later with reference to FIGS. 10A and 10B. In step S1105, the job control print service 605 changes the print settings 906 (job type) of the plurality of print jobs specified by the processing based on the combining settings in step S1104 from a print job which is not a box save job to the box save job. As the method of changing the print settings 906, for example, (1) the job control print service 605 rewrites job data, or (2) job control print service 605 issues an instruction to the printer driver 602 to re-generate a PDL file as a box save job, so as to generate the job of interest as a box job again.

As described above, in step S1104 the job control print service 605 adds a group ID as first identification information indicating jobs to be combined to print jobs to be combined (those to be group jobs) of those held in the spooler 603. In step S1105, the job control print service 605 adds information indicating a box save job to the print settings as second identification information indicating a job (box save job) to be saved on a storage device of the print device. In this way, the job type is changed from the settings indicating a job not to be saved to those indicating a job to be saved.

The job control print service 605 checks in step S1106 if the job accepted in step S1101 is intermediate data (print data) or a PDL file. If the accepted job is intermediate data, the process advances to step S1107; if the accepted job is PDL data, the process advances to step S1108. In step S1107, the job control print service 605 instructs the printer driver 602 to convert the intermediate data into a PDL file. In step S1108, the job control print service 605 transmits the print job (the box save job converted in step S1105 if the combining settings are made) to the print device. In this case, the print job is added with setting information that allows the print device to identify that job as a box job. In this embodiment, after the group ID is added to all print jobs with the combining settings, these jobs are transmitted together. Alternatively, jobs may be transmitted in turn from a job added with the group ID as needed.

Figure 10A:
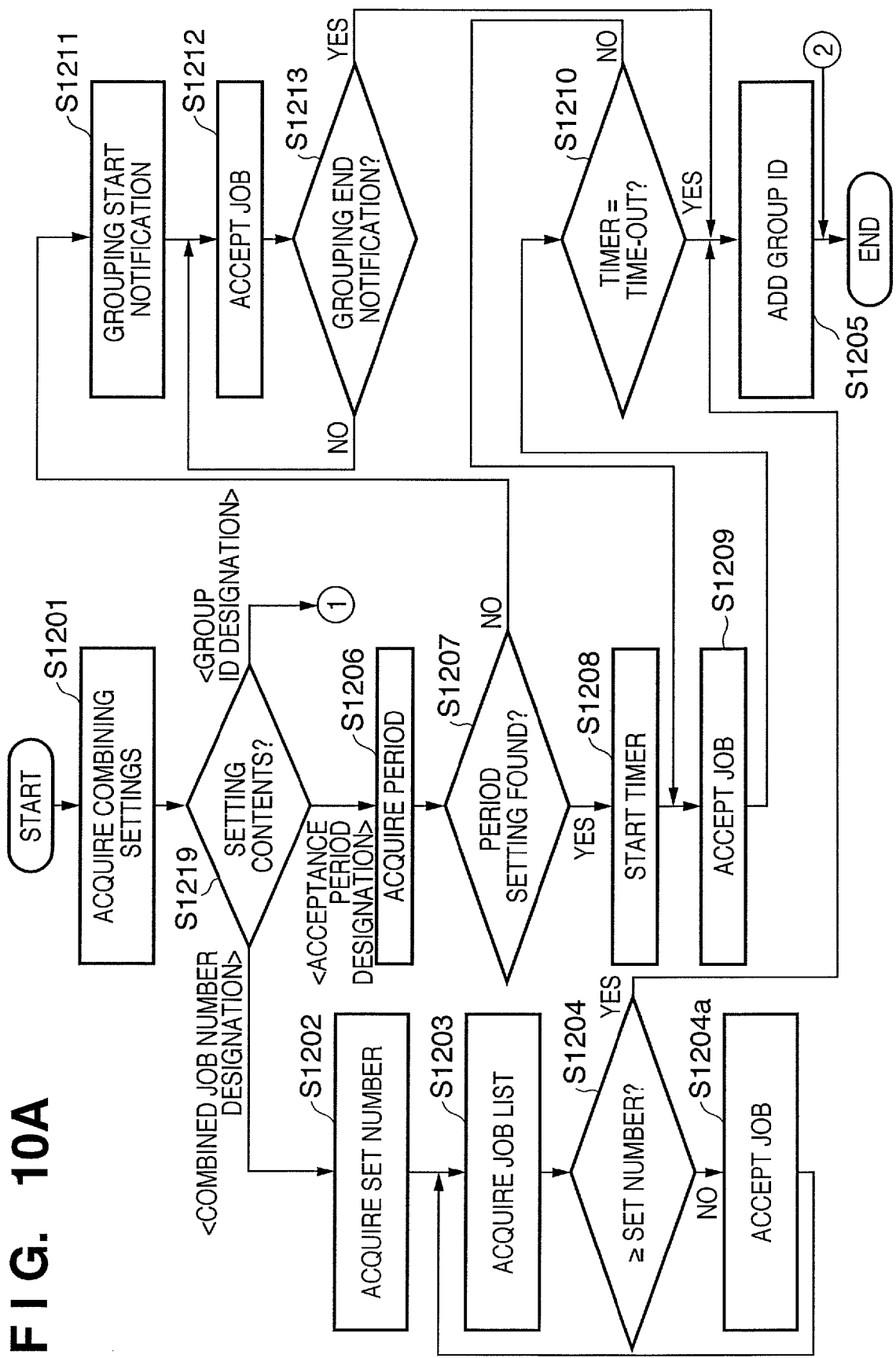

FIGS. 10A and 10B are flowcharts showing processing (the processing in step S1104 in FIG. 9) until the setting information of the user information (FIG. 8) is acquired to specify a plurality of jobs to be combined, jobs are specified for respective settings, and a group ID is added to these jobs in this embodiment.

In step S1201, the job control print service 605 acquires information of the combining settings 1002 from the user information (FIG. 8) held by itself as in step S1102 in FIG. 9. In step S1219, the job control print service 605 branches processes according to the setting contents of the combining settings 1002 acquired in step S1201. In this embodiment, the process branches according to the three different types of combining settings, i.e., "combined job number designation", "acceptance period designation", and "group ID designation", as described above in association with FIG. 8.

<Combined Job Number Designation>

If the combining settings 1002 are set with "combined job number designation", the process advances from step S1219 to step S1202. In step S1202, the job control print service 605 acquires "set number" set in the combining settings 1002. In step S1203, the job control print service 605 acquires the number of managed jobs with reference to a list of held jobs. In step S1204, the job control print service 605 compares the set number with the acquired number of jobs. If the acquired number of jobs is smaller than the set number, the process returns to step S1203 via step S1204a. This indicates that the number of jobs is monitored parallel to acceptance of a new print job. In this way, if the number of jobs in the job list becomes equal to or larger than the set number, the process advances to step S1205. In step S1205, the job control print service 605 generates a unique group ID, assigns the identical group ID to print jobs to be combined (those which are accepted in steps S1101 and S1204a), and writes that group ID in the group ID field 905 of each print job.

<Acceptance Period Designation>

If the combining settings 1002 are set with "acceptance period designation", the process advances from step S1219 to step S1206. The job control print service 605 acquires "period" set in the combining settings 1002 in step S1206, and checks in step S1207 the acquired "period" includes a significant value. If the acquired "period" does not include any significant value (for example, "period"=0 or a negative value), the process advances from step S1207 to step S1211. In step S1211, the job control print service 605 waits until it receives a grouping start notification (combining designation start notification) from the application. Note that the application may either a user interface of the job control print service 605 or another application on the Windows® system. Note that when a notification is received from the other application, the API of the job control print service is used. After reception of the grouping start notification, the job control print service 605 accepts print jobs until it receives a grouping end notification (steps S1212 and S1213). These grouping start and end notifications can be generated when, for example, the user explicitly instructs the start and end of a group via a user interface (not shown). Upon reception of the grouping end notification, the process advances from step S1213 to step S1205. In step S1205, the job control print service 605 adds an identical group ID 905 to all the print jobs accepted from the grouping start notification until the end notification.

On the other hand, if "period" acquired in step S1206 includes a significant value, i.e., if the period is set, the process advances from step S1207 to step S1208. In step S1208, the job control print service 605 sets the acquired "period" value in a timer, and starts the timer. The job control print service 605 accepts print jobs in step S1209 until this timer reaches a time-out. Upon detection of the time-out of the timer, the process advances from step S1210 to step S1205. In step S1205, the job control print service 605 adds an identical group ID 905 to all the print jobs (those which are accepted in steps S1101 and S1209) accepted during the period from the start to the time-out of the timer.

In the above processing, the group ID 905 is added to all jobs which are accepted during the period from the start to the time-out of the timer. However, the present invention is not limited to this. For example, the jobs accepted during that period may be filtered using keywords such as the user name, document name, and the like, and the group ID may then be added to the filtered jobs.

<Group ID Designation>

If the combining settings 1002 are set with "group ID designation", the process advances from step S1219 to step S1215.

In step S1215, the job control print service 605 adds a group ID designated in the combining settings 1002 to the job accepted in step S1101. Note that this group ID is issued by the job control print service 605 when the user selects jobs based on the group ID designation via a user interface (not shown). In step S1216, the job control print service 605 waits for acceptance of a print instruction from the application. If the job control print service 605 accepts a print job during this wait period, it adds the group ID designated in the combining settings 1002 to that job (steps S1216a and S1215). Upon acceptance of the print instruction, the process advances to step S1217 to check if a group ID is notified.

Figure 11:
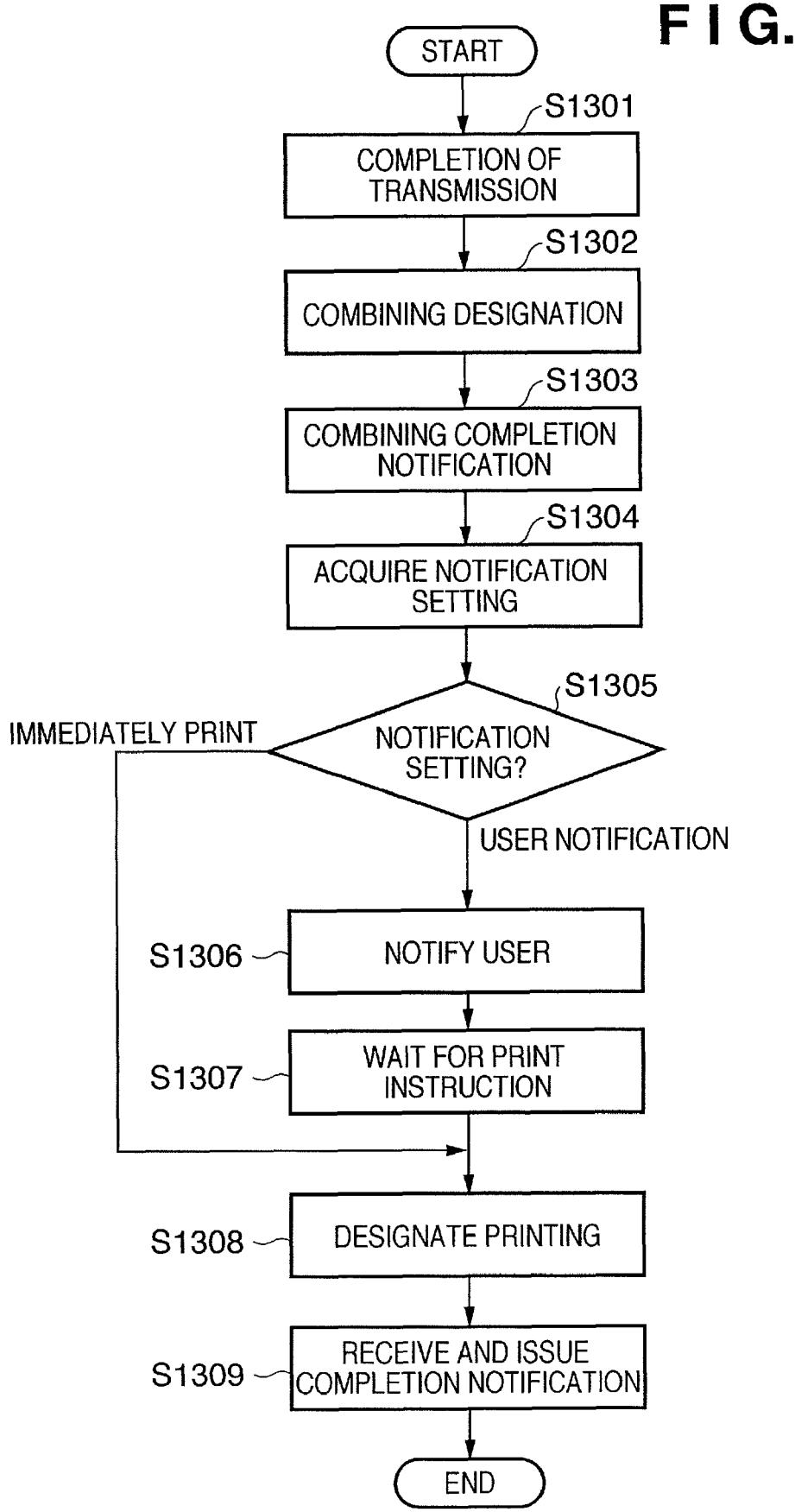
FIG. 11 is a flowchart showing processing in this embodiment from when a print job is transmitted to the print device until completion of paper discharge.

If a group ID is not notified, the process advances to step S1217a, and the job control print service 605 executes transmission processing (steps S1105 to S1108). If print jobs waiting for a print instruction are found in step S1217b, the process returns to step S1216, and the job control print service 605 waits for reception of the print instruction. If no jobs waiting for a print instruction are found, the process advances to step S1301 (FIG. 11 to be described later). Note that the print jobs waiting for the print instruction indicate a plurality of jobs which are explicitly designated by the user as group jobs via a user interface (not shown). On the other hand, if a group ID is notified, the process advances to step S1218. In step S1218, the job control print service 605 searches the job list managed by itself for jobs having the notified group ID, and selects all jobs found as those to be combined.

FIG. 11 is a flowchart showing processing from when a print job is transmitted to the print device until completion of paper discharging in the job control print service 605 of this embodiment.

In step S1301, the job control print service 605 confirms completion of transmission of all jobs in step S1108, i.e., transmission of all jobs added with the identical group ID. This confirmation can be attained by referring to, e.g., a save completion notification from the print device. After confirmation of transmission of all the jobs, in step S1302 the job control print service 605 instructs the print device to combine the jobs with the group ID appended to those which were transmitted in step S1108. In step S1303, the job control print service 605 acquires from the print device information indicating completion of combining of the jobs added with the group ID.

In step S1304, the job control print service 605 acquires the completion notification setting 1003 from the user information (FIG. 8) managed by itself. If the completion notification setting 1003 is set to notify the user, the process advances from step S1305 to step S1306. In step S1306, the job control print service 605 specifies a user to be notified by acquiring the user name 1001 and computer name 1004 from the user information (FIG. 8) managed by itself, and notifies the computer of that user of completion of combining. In step S1307, the job control print service 605 waits for reception of a print instruction for the combined box save job. Upon acceptance of the print instruction, the process advances to step S1308. On the other hand, if the completion notification setting 1003 includes an immediate print setting, the process jumps from step S1305 to step S1308 while skipping steps S1306 and S1307.

In step S1308, the job control print service 605 instructs the print device to print the combined print job combined by the combining designation. In step S1309, the job control print service detects completion of paper discharging of the job whose printing is instructed in step S1308 by a notification from the print device. Upon detection of completion of paper discharging, the job control print service 605 specifies a user based on the user name 1001 and computer name 1004 in the user information (FIG. 8), and notifies the computer of that user of completion of paper discharging.

Note that the combining designation in step S1302 and the print designation in step S1308 may be issued at the same timing.

Figure 12:
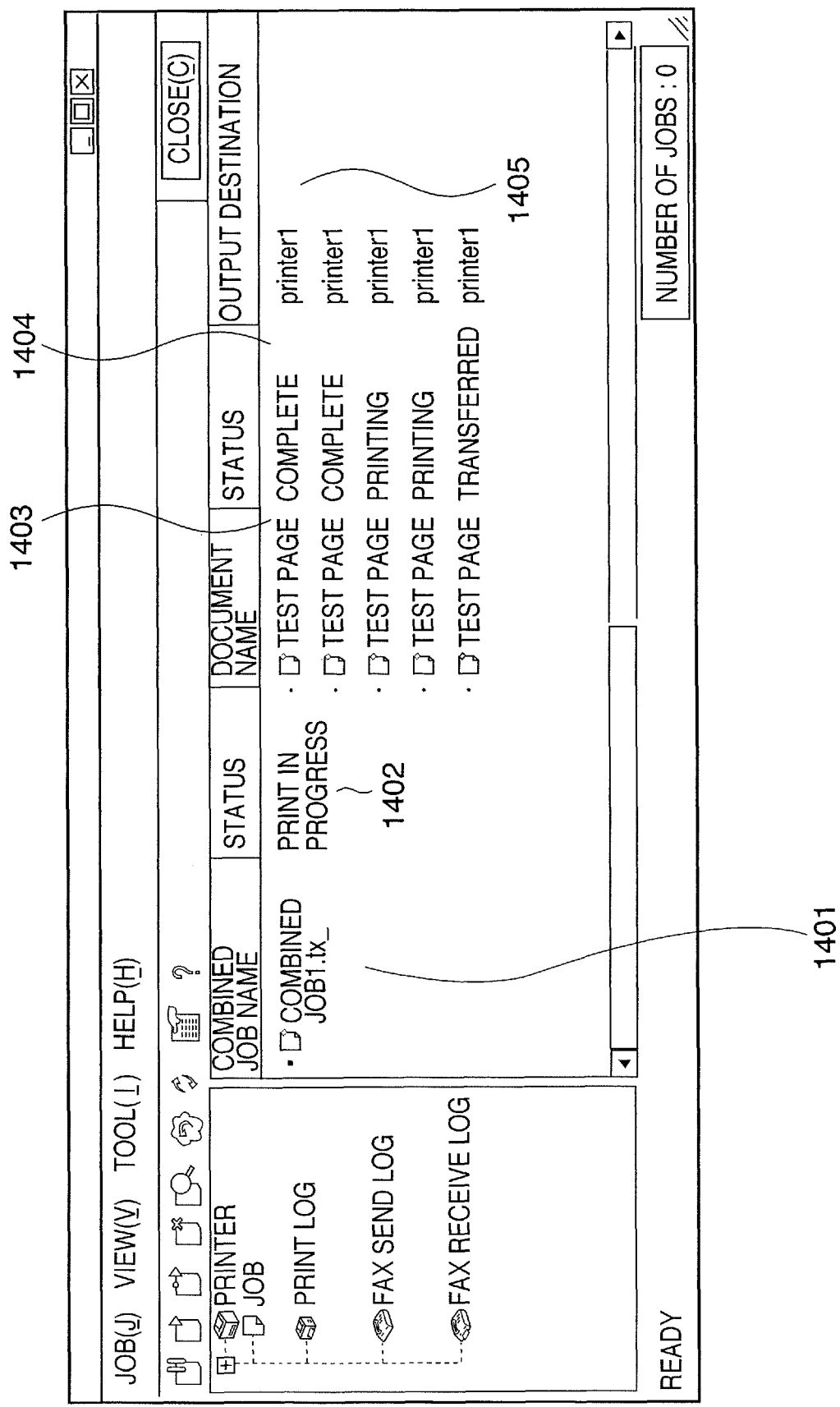
FIG. 12 shows an example of a user interface (UI) of the job control print service 605 in this embodiment.

FIG. 12 shows an example of a user interface (UI) of the job control print service 605 in this embodiment.

Referring to FIG. 12, a column 1401 displays a combined job name after a plurality of jobs are combined. The combined job name is set when the user inputs an arbitrary job name or is automatically set when the print device executes combining processing. When displaying the combined document name, the combined document name 903 in the job information is used.

A column 1402 displays the job status of the combined job. A column 1403 displays the document names before combining. The original document name 901 for each job is used. A column 1404 displays the job statuses of the jobs before combining. The statuses displayed in this column are determined by the job control print service 605 based on event information notified from the print device, and the number of original pages 902 and the number of combined pages 904 of each job. A column 1405 displays a print device name as the output destination.

Note that the number of combined pages and the combined document name (FIG. 7) of each job are sent from the print device to the job control print service 605 using the combining completion notification (S1303). The combining order of jobs is the order they are transmitted to the print device. Therefore, the job control print service 605 can recognize the combining order without receiving any combining order notification from the print device. However, the print device may transmit the combining order together with the combining completion notification. The event information from the print device includes the number of printed pages, and the job control print service 605 determines a job which is in printing, and a job whose printing is complete. For example, if three jobs each of which has the number of original pages=7 are combined, and if the number of printed pages is 10, the job control print service 605 can determine that the first job is complete, and printing of the second job is underway.

Figure 13:
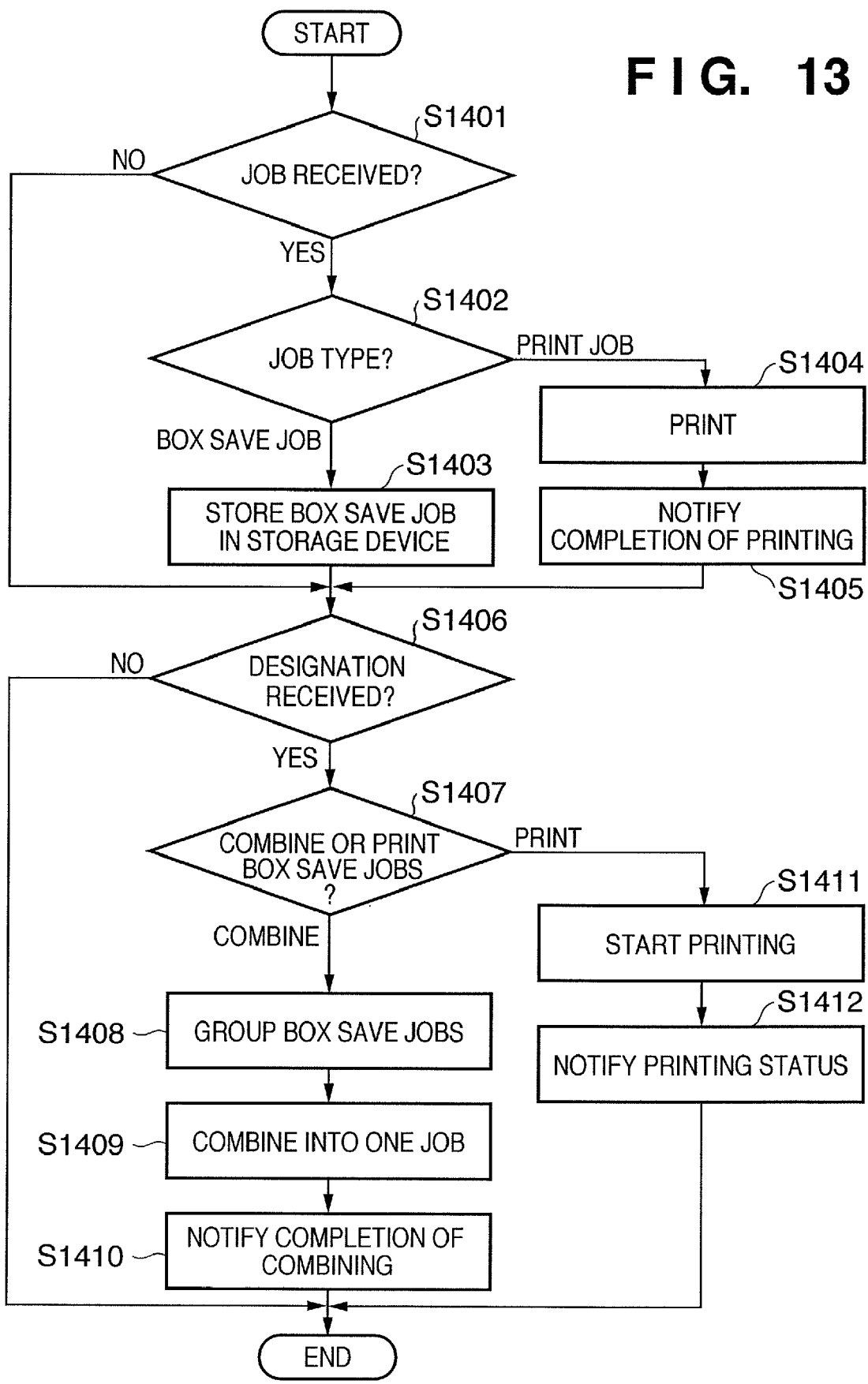
FIG. 13 is a flowchart for explaining the operation of the print device according to this embodiment.

FIG. 13 is a flowchart for explaining the operation on the print device side. Upon reception of a box save job from the print server 101, the print device 607 rasterizes the received job and saves the rasterized job in its own storage device (S1401 to S1403). On the other hand, upon reception of a print job from the print server 101, the print device 607 executes print processing of the received job (S1401, S1402, and S1404). Upon completion of the print processing, the print device 607 notifies the print server 101 of completion of the print processing (S1405).

Upon reception of a combining designation (S1302) of box save jobs from the print server 101, the print device groups and combines box save jobs with the designated group ID into one job (S1406 to S1409). Note that the combining designation includes designation of the group ID. Upon completion of combining of the box save jobs, the print device notifies the print server 101 of completion of combining (S1410. The print server 101 acquires this combining notification in step S1304.

Upon reception of a print instruction (S1308 in FIG. 11) of the combined job from the print server 101, the print device executes print processing of the designated combined job (S1406, S1407, and S1411). The combined job can be designated using, e.g., the group ID. The print device notifies the print server 101 of the progress during printing of the combined job and of completion of the print processing upon completion of printing (S1412). The print server 101 acquires this print status notification in step S1309 in FIG. 11.

Figure 14:
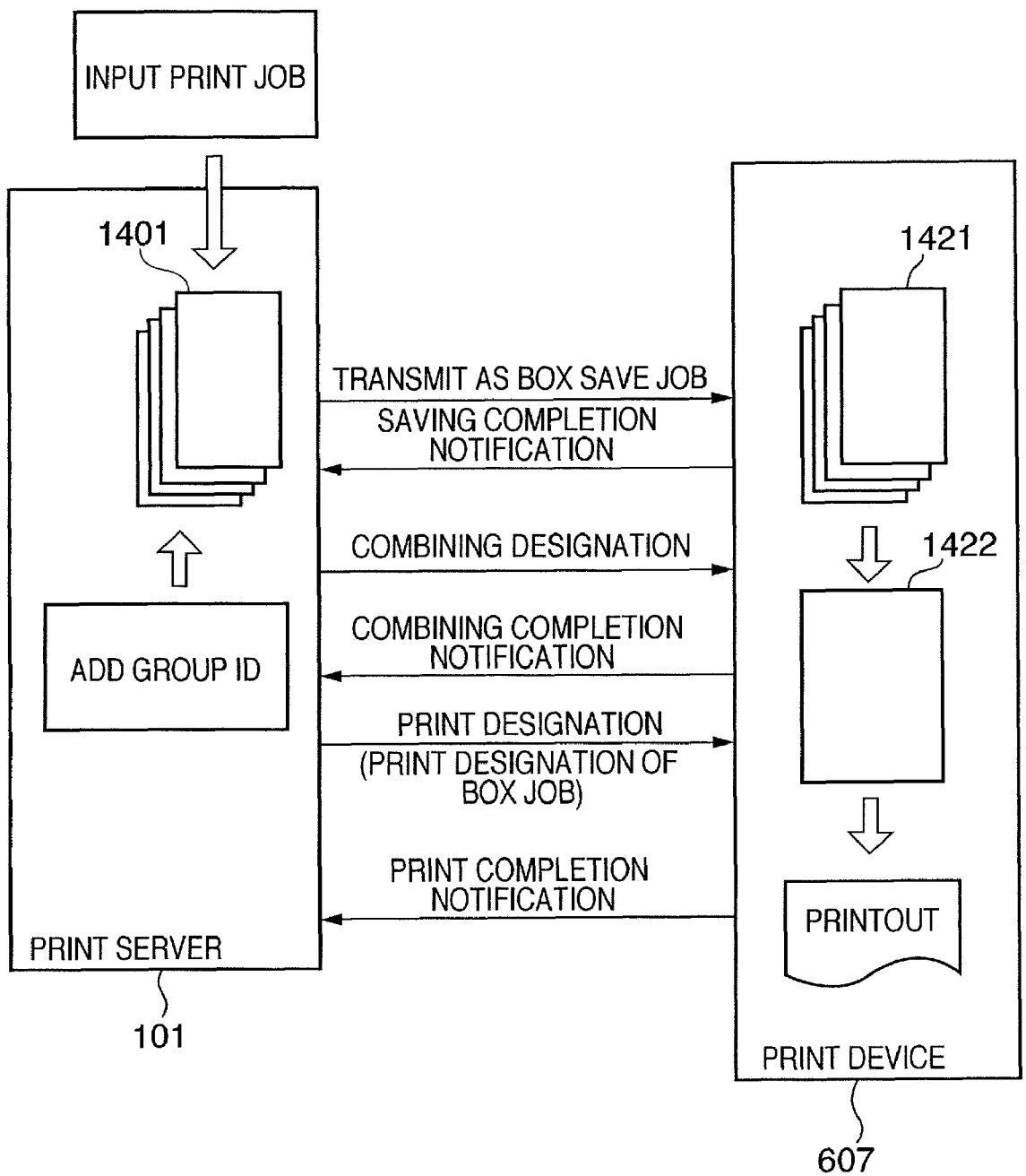
FIG. 14 is a chart for explaining an overview of the operation of the system according to this embodiment.

FIG. 14 shows an overview of the aforementioned processing of this embodiment. When the user inputs a print job 1401, a group ID is added to each print job by the processing described using FIGS. 10A and 10B. The print job 1401 added with the group ID is transmitted to the print device 607 as a box save job 1421, and is saved by the print device 607 (S1105 to S1108, S1401 to S1403). Upon completion of saving of the box save job 1421, the print device 607 notifies the print server 101 (job control print service 605) of completion of saving. Upon reception of saving completion notification, the print server 101 transmits a combining designation including designation of the group ID to the print device 607 (SI302). Upon reception of the combining designation, the print device 607 combines the box save jobs added with the designated group ID to generate a combined job 1422, and notifies the print server 101 of completion of combining (S1406 to S1410). This combining completion notification includes the combined document name 903. Upon reception of the combining completion notification, the print server 101 transmits a print designation of the combined job to the print device 607 (S1308). In response to this print designation, the print device 607 prints the combined job 1422. Upon completion of printing, the print device 607 notifies the print server 101 of this (S1411, S1412).

According to the aforementioned embodiment, upon printing a plurality of print jobs, these jobs are temporarily saved in a large-capacity storage device on the printer, and are automatically combined on the printer. For this reason, the load on the computer and that on the network can be suppressed compared to the method in which jobs are combined on the computer and the combined job is transmitted to the printer. Since jobs are automatically combined according to the settings, the load on the user can be reduced, and designation errors of jobs and the like due to operation errors can be prevented.

Other Embodiments

The embodiments of the present invention have been explained in detail. The present invention can adopt embodiments in the forms of a system, apparatus, method, program, storage medium, and the like. The present invention may be applied to either a system constituted by a plurality of devices, or an apparatus consisting of a single device.

Note that the present invention includes a case wherein the functions of the embodiments are achieved by directly or remotely supplying a software program to a system or apparatus, and reading out and executing the supplied program code by a computer of that system or apparatus. The program to be supplied in this case is that corresponding to each illustrated flowchart in the embodiments.

Therefore, the program code itself installed in a computer to implement the functional processing of the present invention using the computer implements the present invention. Put differently, the present invention includes the computer program itself for implementing the functional processing of the present invention.

In this case, the form of program is not particularly limited, and an object code, a program to be executed by an interpreter, script data to be supplied to an OS, and the like may be used as long as they have the functions of the program.

As a recording medium for supplying the program, the following media can be used. For example, a floppy® disk, hard disk, optical disk, magneto-optical disk, MO, CD-ROM, CD-R, CD-RW, magnetic tape, nonvolatile memory card, ROM, DVD (DVD-ROM, DVD-R), and the like can be used.

As another program supply method, the user establishes a connection to a home page on the Internet using a browser on a client computer, and downloads the computer program of the present invention from the home page onto a recording medium such as a hard disk or the like. In this case, the program to be downloaded may be a compressed file including an automatic installation function. Also, the program code that forms the program of the present invention may be segmented into a plurality of files, which may be downloaded from different home pages. In other words, the present invention includes a WWW server which makes a plurality of users download a program file required to implement the functional processing of the present invention by a computer.

Also, a storage medium such as a CD-ROM or the like, which stores the encrypted program of the present invention, may be delivered to the user. In this case, the user who has cleared a predetermined condition may be allowed to download key information used to decrypt the encrypted program from a home page via the Internet. The user executes the encrypted program using the downloaded key information to install the program on a computer.

The functions of the aforementioned embodiments can be implemented when the computer executes the readout program. Furthermore, the functions of the aforementioned embodiments can be implemented in collaboration with an OS or the like running on the computer based on an instruction of that program. In this case, the OS or the like executes some or all of actual processes, which implement the functions of the aforementioned embodiments.

Furthermore, some or all of the functions of the aforementioned embodiments may be implemented when the program read out from the recording medium is written in a memory equipped on a function expansion board or a function expansion unit, which is inserted in or connected to the computer. In this case, after the program is written in the function expansion board or unit, a CPU equipped on the function expansion board or function expansion unit executes some or all of actual processes based on an instruction of that program.

As described above, according to the present invention, the operation load at the operation unit on the print device side can be reduced while suppressing an increase in load on the information processing apparatus side, and print processing that can prevent interrupt in association with a plurality of print jobs can be executed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-212239, filed Aug. 3, 2006, which is hereby incorporated by reference herein in its entirety.

What is claimed is:

1. An information processing apparatus, which can be connected to a print device which has a function of saving a print job and combining a plurality of saved print jobs, said apparatus comprising:
a spooling unit adapted to spool an accepted print job;
an addition unit adapted to add, in a case that said spooling unit spools not less than a predetermined number of print jobs, first identification information indicating a job to be combined to print jobs spooled by said spooling unit;
an output unit adapted to transmit the print job added with the first identification information by said addition unit to the print device as a save job to be saved on the print device side;
a combining designation unit adapted to designate the print device to combine save jobs added with the first identification information; and
a print designation unit adapted to designate to print the combined save job according to the combining designation by said combining designation unit.

2. The apparatus according to claim 1, further comprising a display unit adapted to display a processing status of the accepted print job on a display device.

3. The apparatus according to claim 1, further comprising a setting unit configured to set the predetermined number based on a user's input through a user interface.

4. An information processing apparatus, which can be connected to a print device which has a function of saving a print job and combining a plurality of saved print jobs, said apparatus comprising:
a spooling unit adapted to spool an accepted print job;
an addition unit adapted to add first identification information indicating a job to be combined to print jobs which are accepted within a predetermined period of time and are spooled by said spooling unit, of a plurality of print jobs spooled by said spooling unit;
an output unit adapted to transmit the print job added with the first identification information by said addition unit to the print device as a save job to be saved on the print device side;
a combining designation unit adapted to designate the print device to combine save jobs added with the first identification information; and
a print designation unit adapted to designate to print the combined save job according to the combining designation by said combining designation unit.

5. The apparatus according to claim 4, further comprising a display unit adapted to display a processing status of the accepted print job on a display device.

6. The apparatus according to claim 4, further comprising a setting unit configured to set the predetermined period based on a user's input through a user interface.

7. A method of controlling a print device by an information processing apparatus, which can be connected to the print device which has a function of saving a print job and combining a plurality of saved print jobs, said method comprising:
a spooling step of spooling an accepted print job;
an addition step of adding, in a case that not less than a predetermined number of print jobs are spooled in the spooling step, first identification information indicating a job to be combined to print jobs spooled in the spooling step;

an output step of transmitting the print job added with the first identification information in the addition step to the print device as a save job to be saved on the print device side;

a combining designation step of designating the print device to combine save jobs added with the first identification information; and a print designation step of designating to print the combined save job according to the combining designation in the combining designation step.

8. The method according to claim 7, further comprising a display step of displaying a processing status of the accepted print job on a display device.

9. The method according to claim 7, further comprising a setting step of setting the predetermined number based on a user's input through a user interface.

10. A method of controlling a print device by an information processing apparatus, which can be connected to the print device which has a function of saving a print job and combining a plurality of saved print jobs, said method comprising:

a spooling step of spooling an accepted print job;

an addition step of adding first identification information indicating a job to be combined to print jobs which are accepted within a predetermined period of time and are spooled in the spooling step, of a plurality of print jobs spooled in the spooling step;

an output step of transmitting the print job added with the first identification information in the addition step to the print device as a save job to be saved on the print device side;

a combining designation step of designating the print device to combine save jobs added with the first identification information; and a print designation step of designating to print the combined save job according to the combining designation in the combining designation step.

11. The method according to claim 10, further comprising a display step of displaying a processing status of the accepted print job on a display device.

12. The method according to claim 10, further comprising a setting step of setting the predetermined period based on a user's input through a user interface.

13. A non-transitory computer-readable storage medium storing a control program that, when executed by a computer in an information processing apparatus, causes the information processing apparatus to execute a print device control method of controlling a print device, the information processing apparatus adapted to be connected to the print device which has a function of saving a print job and combining a plurality of saved print jobs, said method comprising:

a spooling step of spooling an accepted print job;

an addition step of adding, in a case that not less than a predetermined number of print jobs are spooled in the spooling step, first identification information indicating a job to be combined to print jobs spooled in the spooling step;

an output step of transmitting the print job added with the first identification information in the addition step to the print device as a save job to be saved on the print device side;

a combining designation step of designating the print device to combine save jobs added with the first identification information; and a print designation step of designating to print the combined save job according to the combining designation in the combining designation step.

14. A non-transitory computer-readable storage medium storing a control program that, when executed by a computer in an information processing apparatus, causes the information processing apparatus to execute a print device control method of controlling a print device, the information processing apparatus adapted to be connected to the print device which has a function of saving a print job and combining a plurality of saved print jobs, said method comprising:

a spooling step of spooling an accepted print job;

an addition step of adding first identification information indicating a job to be combined to print jobs which are accepted within a predetermined period of time and are spooled in the spooling step, of a plurality of print jobs spooled in the spooling step;

an output step of transmitting the print job added with the first identification information in the addition step to the print device as a save job to be saved on the print device side;

a combining designation step of designating the print device to combine save jobs added with the first identification information; and a print designation step of designating to print the combined save job according to the combining designation in the combining designation step.

* * * * *